United States Patent
Cimatti et al.

(10) Patent No.: US 9,895,981 B2
(45) Date of Patent: Feb. 20, 2018

(54) ELECTRIC POWER SYSTEM OF A VEHICLE WITH ELECTRIC PROPULSION

(71) Applicant: FERRARI S.p.A., Modena (IT)

(72) Inventors: Franco Cimatti, Pavullo (IT); Fabrizio Favaretto, Formigine (IT)

(73) Assignee: FERRARI S.p.A. (IT)

( * ) Notice: Subject to any disclaimer, the term of this patent is extended or adjusted under 35 U.S.C. 154(b) by 464 days.

(21) Appl. No.: 14/741,517

(22) Filed: Jun. 17, 2015

(65) Prior Publication Data

US 2015/0360573 A1    Dec. 17, 2015

(30) Foreign Application Priority Data

Jun. 17, 2014  (IT) .............................. BO2014A0336

(51) Int. Cl.
*B60L 11/18*    (2006.01)
*B60L 11/02*    (2006.01)
(Continued)

(52) U.S. Cl.
CPC ............... *B60L 11/18* (2013.01); *B60K 1/00* (2013.01); *B60K 1/02* (2013.01); *B60K 1/04* (2013.01); *B60K 11/02* (2013.01); *B60L 11/02* (2013.01); *B60L 11/1803* (2013.01); *B60L 11/1814* (2013.01); *B60L 11/1874* (2013.01); *B60L 11/1877* (2013.01); *B60W 10/26* (2013.01); *H01M 10/441* (2013.01);
(Continued)

(58) Field of Classification Search
CPC .................................. B60L 11/02; B60L 11/18
See application file for complete search history.

(56) References Cited

U.S. PATENT DOCUMENTS 6,220,380 B1    4/2001  Mita et al.
8,527,126 B2 *  9/2013  Yamamoto .......... B60L 11/1861
                                                180/65.265

(Continued)

FOREIGN PATENT DOCUMENTS

DE    102011051624    1/2013
EP         2039558 A1    3/2009

(Continued)

OTHER PUBLICATIONS

Corresponding International Search Report for EP 15172237 dated Nov. 11, 2015.
Corresponding Search Report for EP 15172237 dated Mar. 2, 2016.

*Primary Examiner* — Jeffrey Shin
(74) *Attorney, Agent, or Firm* — The Belles Group, P.C.

(57) ABSTRACT

An electric power system of a vehicle with electric propulsion having: an electric machine; a storage system provided with two chemical battery packs electrically separated from each other; an electronic DC/AC power converter, which exchanges electric energy with the storage system and controls the electric machine; a pair of electronic DC/DC power converters, each of which increases the voltage and has a low-voltage side, which is electrically connected only and exclusively to a corresponding chemical battery, and a high-voltage side, which is connected to the electronic DC/AC power converter in parallel to the high-voltage side of the other electronic DC/DC power converter; and a common container, which houses the storage system and the electronic power converters therein.

16 Claims, 6 Drawing Sheets

(51) Int. Cl.
  *B60K 1/00* (2006.01)
  *B60K 1/02* (2006.01)
  *B60K 1/04* (2006.01)
  *B60K 11/02* (2006.01)
  *H01M 10/44* (2006.01)
  *H01M 10/625* (2014.01)
  *H01M 10/663* (2014.01)
  *H01M 10/6568* (2014.01)
  *H01M 10/66* (2014.01)
  *B60W 10/26* (2006.01)
  *H01M 2/10* (2006.01)
  *H01M 10/6569* (2014.01)

(52) U.S. Cl.
  CPC ..... *H01M 10/625* (2015.04); *H01M 10/6568* (2015.04); *H01M 10/66* (2015.04); *H01M 10/663* (2015.04); *B60K 2001/005* (2013.01); *B60K 2001/006* (2013.01); *B60L 2210/12* (2013.01); *B60L 2210/14* (2013.01); *B60L 2210/30* (2013.01); *B60L 2210/40* (2013.01); *B60L 2240/425* (2013.01); *B60L 2240/525* (2013.01); *B60L 2240/545* (2013.01); *B60Y 2200/92* (2013.01); *B60Y 2400/61* (2013.01); *B60Y 2410/10* (2013.01); *H01M 2/1077* (2013.01); *H01M 10/6569* (2015.04); *Y02T 10/642* (2013.01); *Y02T 10/70* (2013.01); *Y02T 10/705* (2013.01); *Y02T 10/7005* (2013.01); *Y02T 10/7072* (2013.01); *Y02T 10/7077* (2013.01); *Y02T 10/7225* (2013.01); *Y02T 10/7233* (2013.01); *Y02T 10/7241* (2013.01); *Y02T 90/127* (2013.01); *Y02T 90/14* (2013.01)

(56) References Cited

U.S. PATENT DOCUMENTS

| | | |
|---|---|---|
| 2003/0107352 A1 | 6/2003 | Downer et al. |
| 2009/0243385 A1 | 10/2009 | Ichikawa |
| 2010/0025132 A1* | 2/2010 | Hill ............... B60K 1/04 180/65.29 |
| 2010/0044131 A1 | 2/2010 | Teraya |
| 2010/0116574 A1 | 5/2010 | Gilmore |
| 2010/0198440 A1* | 8/2010 | Fujitake ........ B60L 11/1816 701/22 |
| 2013/0141045 A1* | 6/2013 | Karim ............ H02J 7/0068 320/110 |

FOREIGN PATENT DOCUMENTS

| | | |
|---|---|---|
| EP | 2068431 | 6/2009 |
| EP | 2113410 | 11/2009 |
| EP | 2117106 A1 | 11/2009 |
| EP | 2236345 | 10/2010 |
| WO | 2012084547 | 6/2012 |

* cited by examiner

ELECTRIC POWER SYSTEM OF A VEHICLE WITH ELECTRIC PROPULSION

CROSS-REFERENCE TO RELATED APPLICATIONS

The present application claims priority under 35 U.S.C. § 119 to Italian Patent Application No. BO2014A000336, filed Jun. 17, 2014, the entirety of which is incorporated herein by reference.

FIELD OF THE INVENTION

The present invention relates to an electric power system of a vehicle with electric propulsion.

The present invention is advantageously applied to a road vehicle with hybrid propulsion, to which explicit reference will be made in the following description without therefore losing in generality.

BACKGROUND OF THE INVENTION

A hybrid vehicle comprises an internal combustion thermal engine, which transmits torque to the driving wheels by means of a transmission provided with a gearbox, and at least one electric machine which is electrically connected to an electric storage system and mechanically connected to the driving wheels.

The electric power system of a hybrid vehicle comprises a storage device provided with a chemical battery pack and a two-way electronic DC/AC power converter, which is connected to the storage device on the DC side and is connected to the electric machine on the AC side, and has the function of controlling the electric machine itself.

The chemical batteries used in current road vehicles with hybrid propulsion may have high specific storable electric energy (i.e. per unit of mass and/or volume) and low specific deliverable electric power (i.e. per unit of mass and/or volume), and thus be adapted to meet the needs of a long trip traveled at constant speed (and, especially, with limited accelerations/decelerations). Alternatively, the chemical batteries used in current road vehicles with hybrid propulsion may have low specific storable electric energy (i.e. per unit of mass and/or volume) and high specific deliverable electric power (i.e. per unit of mass and/or volume), and thus be adapted to meet the needs of a short trip traveled at high speed (and, especially, with fast accelerations/decelerations).

In order to attempt to obtain an acceptable trade-off between range needs (for which chemical batteries which have high specific electric energy are required) and performance needs (for which chemical batteries which have high specific electric power are required), it has been attempted to manufacture trade-off chemical batteries which have intermediate features between the two extremes; however, it has been observed that such trade-off chemical batteries are a "second-rate" trade-off, i.e. the significant reduction of specific electric energy does not correspond to an equally significant increase of specific electric power, and vice versa.

In order to attempt to obtain an acceptable trade-off between range needs (for which chemical batteries which have high specific electric energy are required) and performance needs (for which chemical batteries which have high specific power are required), it has also been suggested to include both chemical batteries which have high specific electric energy and chemical batteries which have high specific energy in the storage system. However, the overall results (in terms of range and performance) and in particular the operative lifespan of the chemical batteries have been found not to be entirely satisfactory because the "final result" was in some way inferior to the sum of the single parts.

Italian patent application BO2012A000315 describes an electric power system of a vehicle with electric propulsion; the electric power system has: a pair of connected electric machines; a storage system comprising two chemical battery packs electrically separated from each other; a pair of electronic DC/AC power converters, each of which exchanges electric energy with the storage system and controls a corresponding electric machine; and a pair of electronic DC/DC power converters, each of which increases the voltage and has a low-voltage side, which is electrically connected only and exclusively to a corresponding chemical battery pack, and a high-voltage side, which is connected to both electronic DC/AC power converters in parallel to the high-voltage side of the other electronic DC/DC power converter. However, the electric power system described in Italian patent application BO2012A000315 has relatively high dimensions.

Patent application EP2117106A1 describes an electric power system of a vehicle with electric propulsion; the electric power system comprises:

two electric machines MG1 and MG2;

a storage system comprising two chemical battery packs 10 and 20 electrically separated from each other;

a first electronic DC/AC power converter INV1, which exchanges electric energy with the storage system and controls a first electric machine MG1;

a second electronic DC/AC power converter INV2, which exchanges electric energy with the storage system and controls a second electric machine MG2;

a first electronic DC/DC power converter 18, which increases the voltage and has a low-voltage side, which is electrically connected only and exclusively to a first chemical battery pack 10, and a high-voltage side, which is connected to both electronic DC/AC power converters INV1, INV2; and a second electronic DC/DC power converter 28, which increases the voltage and has a low-voltage side, which is electrically connected only and exclusively to a second chemical battery pack 20, and a high-voltage side, which is connected to both electronic DC/AC power converters INV1, INV2 in parallel to the high-voltage side of the first electronic DC/DC power converter CONV1.

SUMMARY OF THE INVENTION

It is the object of the present invention to provide an electric power system for a vehicle with electric propulsion, which is free from the above-described drawbacks while being easy and cost-effective to be manufactured.

According to the present invention, an electric power system for a vehicle with electrical propulsion is provided as claimed in the appended claims.

BRIEF DESCRIPTION OF THE DRAWINGS

The present invention will now be described with reference to the accompanying drawings, which show a non-limitative embodiment thereof, in which.

DETAILED DESCRIPTION OF THE INVENTION

Figure 1:
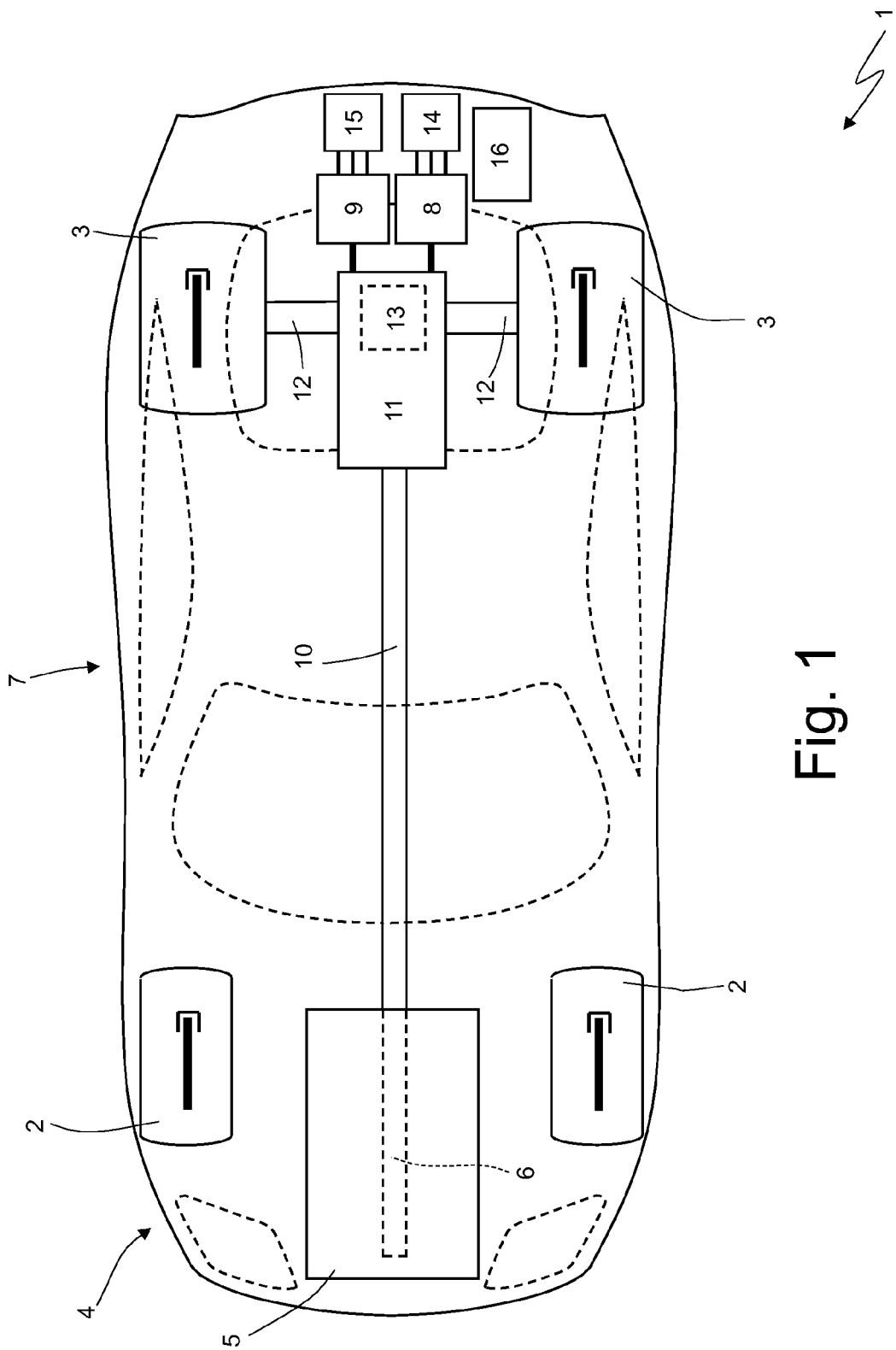
FIG. 1 is a diagrammatic, plan view of a road vehicle with hybrid propulsion.

In FIG. 1, reference numeral 1 indicates as a whole a road vehicle with hybrid propulsion provided with two front wheels 2 and two rear driving wheels 3, which receive torque from a hybrid propulsion system 4.

The hybrid propulsion system 4 comprises a thermal internal combustion engine 5 arranged in front position and provided with a drive shaft 6, a transmission 7 which transmits the torque generated by the internal combustion engine 5 to the rear driving wheels 3, and two electric machines 8 and 9 which are mechanically connected to transmission 7 and are reversible (i.e. may work as electric motor by drawing electric energy and generating mechanical torque, and as electric generator by drawing mechanical energy and generating electric energy). Alternatively, one of the electric machines 8 and 9 (or a further third electric machine) could be mechanically connected to a turbocharger of the internal combustion engine 5 instead of being mechanically connected to transmission 7.

Transmission 7 comprises a propeller shaft 10, which on one end is angularly integral with the drive shaft 6 and on the other end is mechanically connected to a gearbox 11, which is arranged in rear position and transmits motion to the rear driving wheels 3 by means of two axle shafts 12, which receive motion from a differential 13.

Both electric machines 8 and 9 are mechanically connected to gearbox 11. The electric machine 8 is controlled by an electronic DC/AC power converter 14 (i.e. an inverter) and the electric machine 9 is driven by an electronic DC/AC power converter 15 (i.e. an inverter). Both electronic power converters 14 and 15 are electrically connected to an electric energy storage system 16 provided with chemical batteries.

Figure 2:
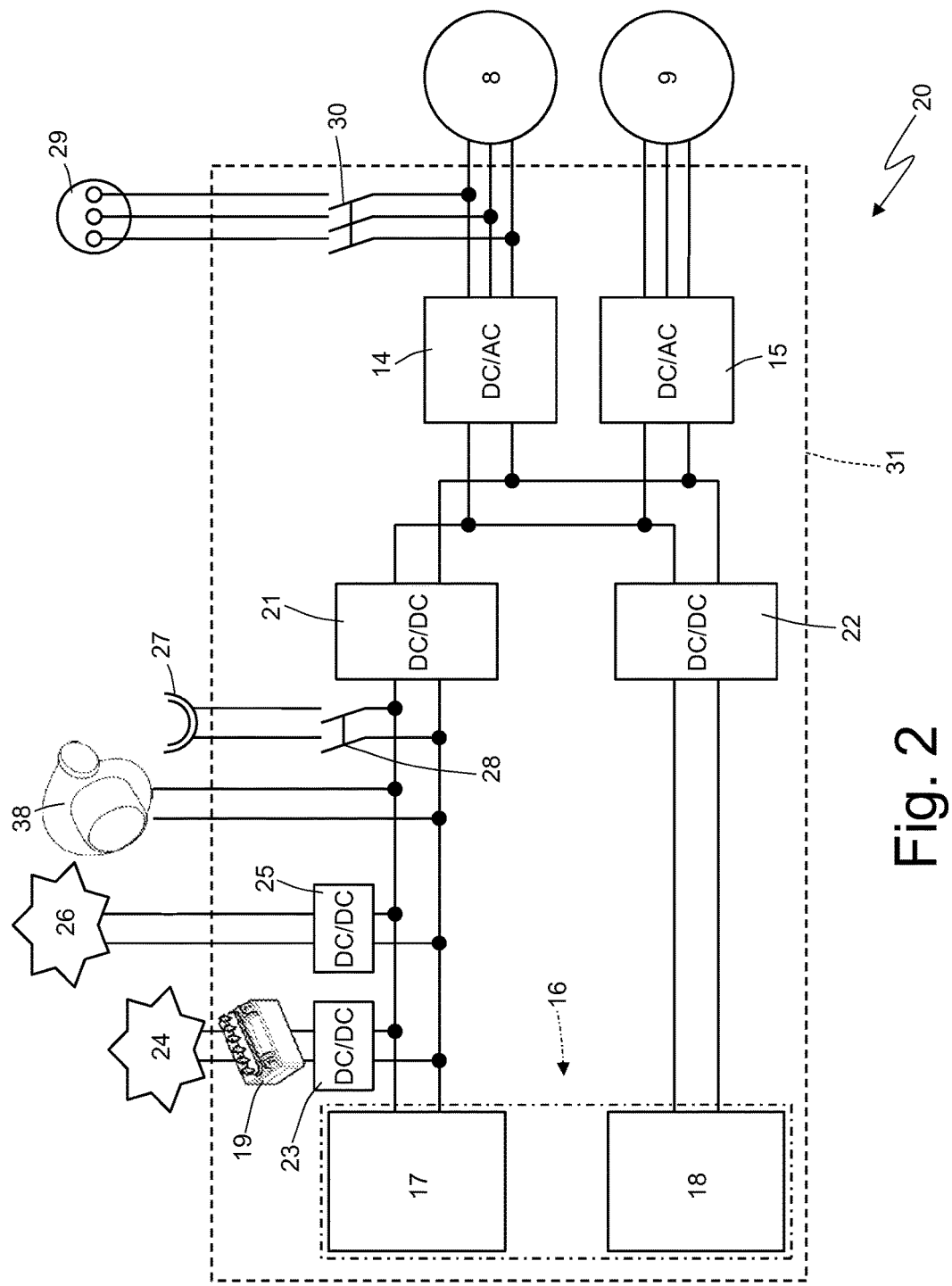
FIG. 2 is a diagrammatic view of an electric power system of the vehicle in FIG. 1.

As shown in FIG. 2, the storage system 16 comprises two distinct chemical battery packs 17 and 18, each of which consists of a plurality of chemical batteries connected to one another in series and/or in parallel; each chemical battery comprises respective electrochemical cells, which are adapted to convert the stored chemical energy into electric energy and vice versa. The chemical batteries of the two chemical battery packs 17 and 18 have different electric energy storage and delivery features: in particular, the chemical batteries of the chemical battery pack 17 have a higher specific storable electric energy (i.e. per unit of mass and/or volume) and a lower specific deliverable electric power (i.e. per unit of mass and/or volume) than the chemical batteries of the battery pack 18.

Therefore, the chemical batteries of battery pack 17 are adapted to meet the needs of a long trip traveled at moderate speed (and, especially, with limited accelerations/decelerations) because they have the advantage of being able to provide a high amount of specific electric energy (i.e. per unit of mass and/or volume) but have the disadvantage of not being able to deliver a very high specific electric power (i.e. per unit of mass and/or volume), and thus allow the road vehicle 1 to travel considerable distances in electric mode (high range), but not to allow the road vehicle 1 to achieve high dynamic performance in electric mode. Instead, the chemical batteries of the battery pack 18 are adapted to meet the needs of a short trip traveled at high speed (and, especially, with high accelerations/decelerations) because they have the advantage of being able to deliver a very high specific electric power (i.e. per unit of mass and/or volume) but on the contrary are not able to provide a high amount of specific electric energy (i.e. per unit of mass and/or volume), and thus allow the road vehicle 1 to achieve high dynamic performance in electric mode, but do not allow vehicle 1 to travel considerable distances in electric mode. The proportion between the two chemical battery packs 17 and 18 is chosen during the step of designing as a function of the desired range/performance ratio in electric mode.

As shown in FIG. 2, the road vehicle 1 is provided with an electric power system 20, which comprises the storage system 16 provided with two chemical battery packs 17 and 18, the two electronic power converters 14 and 15 which control the two electric machines 8 and 9, and two electronic DC/DC power converters 21 and 22 (e.g. of the "buck-boost" type) which are interposed between the chemical battery packs 17 and 18 of the storage system 16 and the two electronic power converters 14 and 15 and have the function of increasing the voltage. The nominal voltage of the chemical battery pack 17 is 380 Volt (obviously, it could also be different, according to different alternative embodiments), the nominal voltage of the chemical battery pack 18 is 200 Volt (obviously, it could also be different according to alternative embodiments), while the nominal voltage of the electronic power converters 14 and 15 is 700 Volt (obviously, it could also be different according to alternative embodiments); therefore, the function of the electronic power converters 21 and 22 is to increase the voltage supplied by the chemical battery packs 17 and 18 to the values required by the electronic power converters 14 and 15 (it is apparent that the two electronic power converters 14 and 15 have different nominal increase ratios, because they receive differentiated electric input voltages and supply the same electric output voltage).

The electronic power converter 21 has a low-voltage side, which is connected only to the chemical battery pack 17 (i.e. is completely isolated from the chemical battery pack 18) and a high-voltage side, which is connected in parallel to a high-voltage side of the electronic power converter 22. Similarly, the electronic power converter 22 has a low-voltage side which is connected only to the chemical battery pack 18 (i.e. is completely isolated from the chemical battery pack 17) and a high-voltage side, which is connected in parallel to a high-voltage side of the electronic power converter 21. The two electronic power converters 14 and 15 are both connected in parallel to the high-voltage sides of the two electronic power converters 21 and 22 (i.e. the DC sides of the two electronic power converters 14 and 15 are connected to each other in parallel). Thereby, electronic power converter 21 on low-voltage side exchanges electric energy only with the chemical battery pack 17 (i.e. not with the chemical battery pack 18) and on high-voltage side exchanges electric energy with both electronic power converters 14 and 15; similarly, electronic power converter 22 on low-voltage side exchanges electric energy only with the chemical battery pack 18 (i.e. not with the chemical battery pack 17) and on high-voltage side exchanges electric energy with both electronic power converters 14 and 15.

It is worth noting that the two electronic power converters 21 and 22 could be integrated in a single physical unit, i.e.

could both be arranged inside a single container, and could thus have auxiliary components in common. Furthermore, it is worth noting that electronic power converter 21 must be optimized as a function of the features of the chemical battery pack 17 (i.e. relatively high energy and low power), while electronic power converter 22 must be optimized as a function of the chemical battery pack 18 (i.e. relatively low energy and high power).

Each electronic power converter 21 or 22 is adapted to provide always the same constant voltage on high-voltage side (i.e. towards the electronic power converters 14 and 15) independently from the voltage present on low-voltage side (i.e. at the terminals of the corresponding the chemical battery pack 17 or 18). In other words, the transformation ratio of each electronic power converter 21 or 22 is continuously varied to maintain the voltage on high-voltage side always constant and equal to a nominal value. Furthermore, each electronic power converter 21 or 22 is adapted to filter (i.e. block, compensate) the high-frequency current/voltage oscillations generated by the electronic DC/AC power converters 14 and 15.

The electric power system 20 comprises an electronic DC/DC power converter 23 which supplies a low-voltage section 24 (having a nominal voltage of 12 Volt) to which part of the auxiliary services of the road vehicle 1 are connected; furthermore, the electric power system 20 comprises an electronic DC/DC power converter 25 which supplies a low-voltage section 26 (having a nominal voltage of 48 Volt) to which the remaining part of the auxiliary services of the road vehicle 1 are connected. In other words, the auxiliary services of the road vehicle 1 which require electric power supply are divided between low-voltage sections 24 and 26; for example, the auxiliary services of the road vehicle 1 which require electric power supply may comprise an electric starter motor of the thermal engine 5, an electric motor which actuates a pump of a power steering system, an electric motor which actuates a circulation pump of a cooling system of the thermal engine 5 and/or of the electric machines 8 and 9, a radio, a lighting and indicating system etc. The electronic power converters 23 and 25 are normally of the one-way type (i.e. capable of transferring electric energy only towards the low-voltage sections 24 and 26 and not vice versa). The low-energy consumption electric/electronic devices (radio, satellite navigator, interior passenger compartment lighting, etc.) are generally connected to the low-voltage section 24, while the electric/electronic devices with higher energy consumption (pumps, light clusters etc.) are connected to the low-voltage section 26. The low-voltage section 24 is generally provided with a buffer chemical battery 19 (obviously operated at 12 Volt and having a modest energy capacity compared to the chemical battery packs 17 and 18), which is arranged downstream of the electronic power converter 23, while the low-voltage section 26 is free from electric energy storage systems provided with chemical batteries (i.e. does not have any chemical battery) and receives electric energy only through the electronic power converter 25.

In the embodiment shown in FIG. 2, the electronic power converters 23 and 25 are connected only to the chemical battery pack 17 and to the corresponding electronic power converter 21 (i.e. receive electric energy from the chemical battery pack 17 and/or from the electronic power converter 21).

The electric power system 20 comprises a DC recharging socket 27, which is connected only to the chemical battery pack 17 by means of the interposition of an electronically controlled switch 28; the switch 28 is normally open and is closed only when the recharging socket 27 is connected to a recharging circuit. Obviously, the chemical battery pack 17 is recharged directly by using the recharging socket 27, but the chemical battery pack 18 can also be recharged indirectly by using the electronic power converters 21 and 22 (i.e. the electric energy is converted firstly by the electronic power converter 21 and then by the electronic power converter 22 to reach the chemical battery pack 18 starting from the recharging socket 27).

The electronic power system 20 comprises an AC recharging socket 29 which is connected to the electronic DC/AC power converter 14 (but the recharging socket 29 could be connected indifferently also to electronic DC/AC power converter 15) so as to use the electronic DC/AC power converter 14 to convert the AC coming from the recharging socket 29 into DC which through the electronic power converters 21 and 22 reaches the chemical battery packs 17 and 18 to recharge the chemical battery packs 17 and 18 themselves.

The electronic power system 20 comprises a common container 31 which houses the accumulation system 16 (i.e. both chemical battery packs 17 and 18) and all the power electronics, i.e. the electronic power converters 14, 15, 21, 22, 23 and 25 therein. In other words, the storage system 16 (the chemical battery packs 17 and 18) and all the power electronics (the electronic power converters 14, 15, 21, 22, 23 and 25) is housed in the same common container 31. According to a preferred (but not binding) embodiment, the buffer chemical battery 19 of the low-voltage section 24 is housed inside the common container 31.

Figure 3:
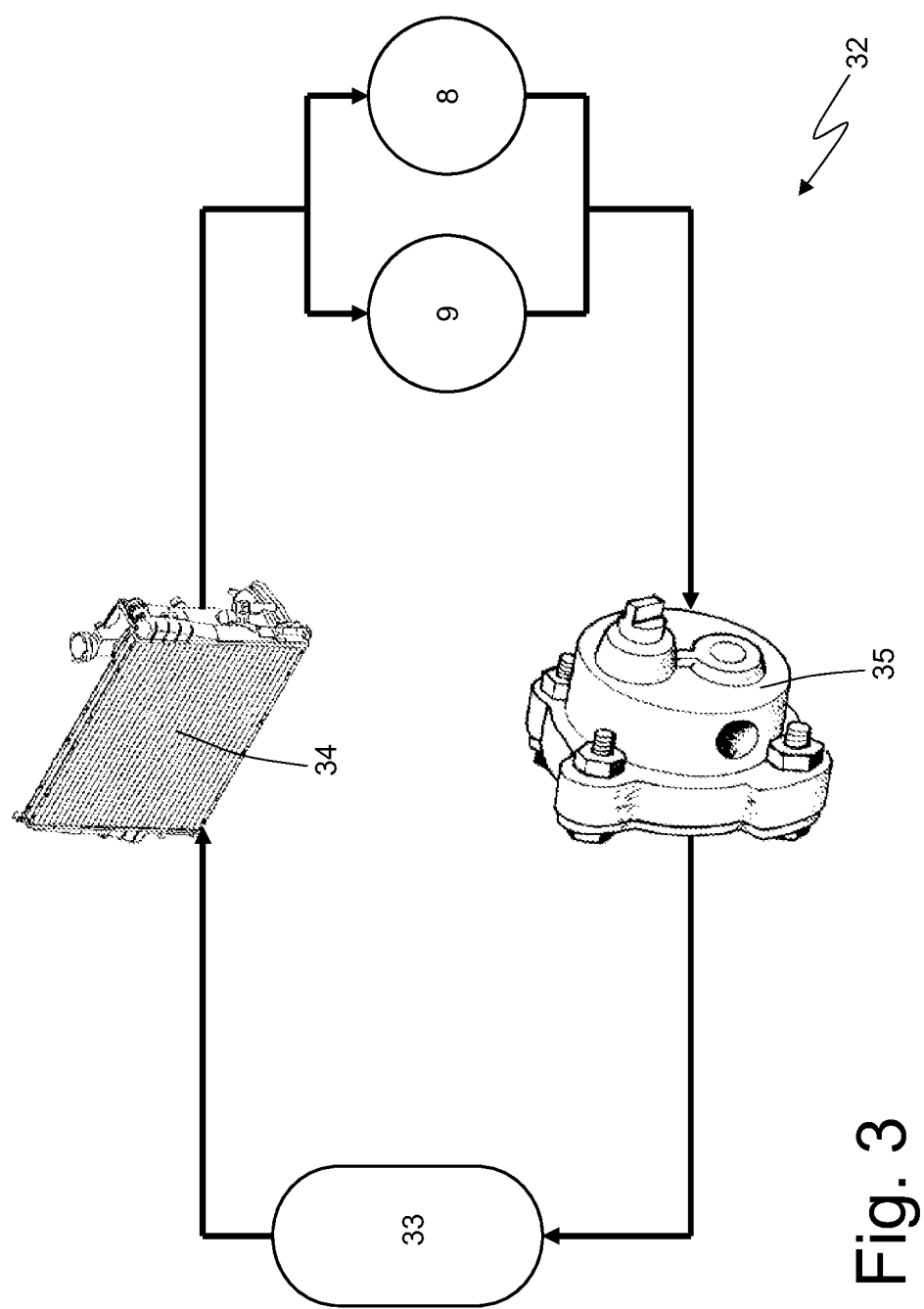
FIG. 3 is a diagrammatic view of a lubrication system of the electric machines of the road vehicle in FIG. 1.

As shown in FIG. 3, a lubrication system 32 of the electric machines 8 and 9 is provided to feed an adequate flow of lubrication oil to the electric machines 8 and 9 themselves. The lubrication system 32 is provided with a lubrication circuit comprising a tank 33 for the lubricant oil, a radiator 34 for cooling the lubricant oil, and a circulation pump 35, which is normally electrically actuated (i.e. actuated by an electric motor in DC at low voltage, preferably having a nominal voltage of 48 Volt, i.e. belonging to the low-voltage section 26). In the embodiment shown in FIG. 3, the two electric machines 8 and 9 are connected in parallel in the lubrication circuit of the lubrication system 32, but alternatively the two electric machines 8 and 9 could be connected in series in the lubrication circuit.

Figure 4:
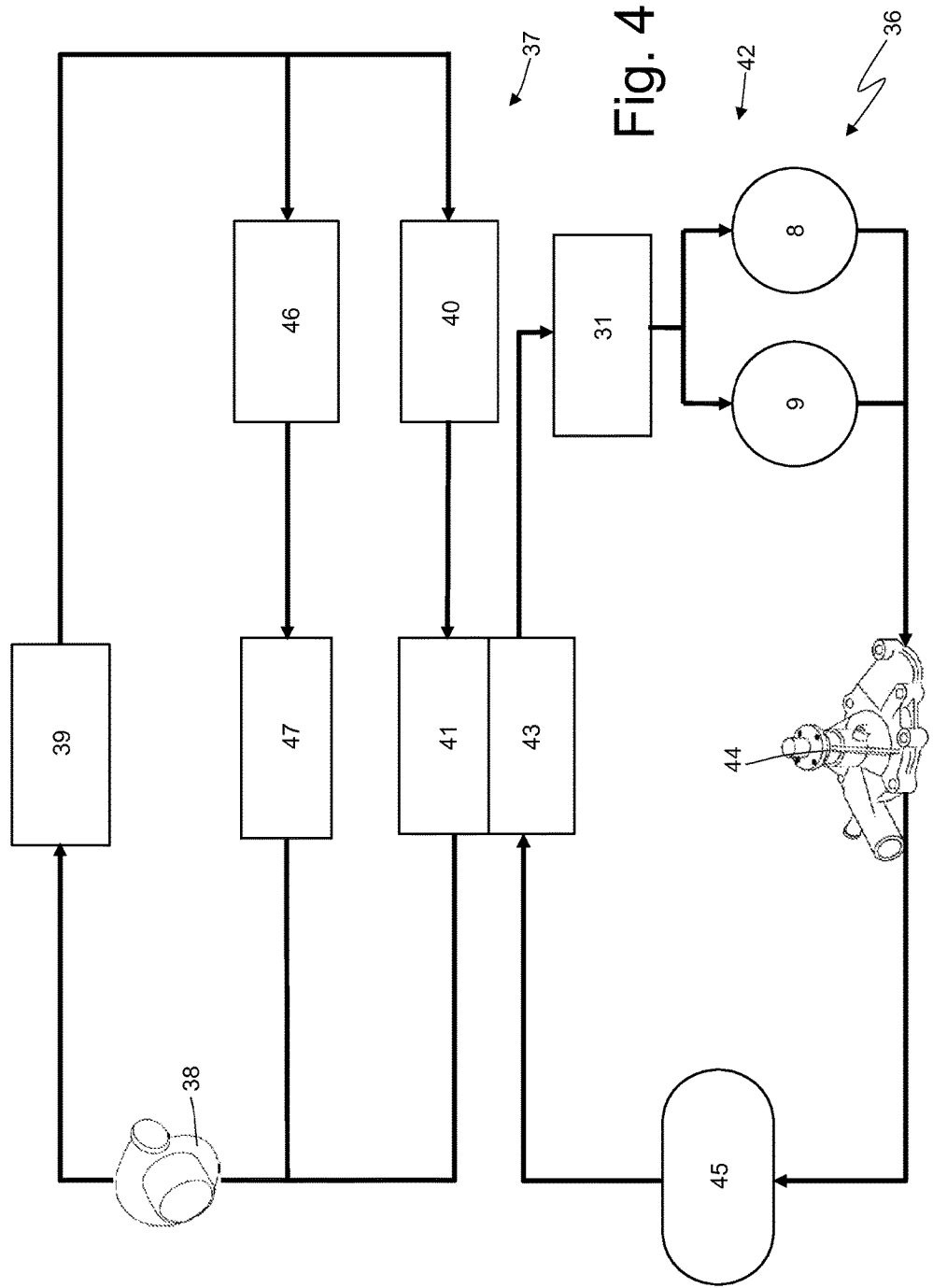
FIG. 4 is a diagrammatic view of a cooling system of the electric power system in FIG. 2.

As shown in FIG. 4, a cooling system 36, which uses a compression refrigeration cycle for cooling all the components of the electric power system 20 (i.e. the storage system 16, the electronic power converters 14, 15, 21, 22, 23 and 25, and the electric machines 8 and 9) is provided. The cooling system 36 comprises a refrigeration circuit 37, which implements a compression refrigeration cycle, contains a refrigeration fluid (e.g. HCFC or hydrochlorofluorocarbons) and comprises, in turn, a compressor 38, a condenser 39, an expansion valve 40 (or lamination valve), and an evaporator 41.

According to a preferred embodiment, compressor 38 is of the rotary type and is electrically actuated (i.e. is actuated in DC by an electric motor); the electric motor of compressor 38 is preferably supplied directly by the chemical battery pack 17 (as shown in FIG. 2). Alternatively, compressor 38 is operated by the shaft of the electric machine 8 or by the shaft of the electric machine 9; according to a preferred embodiment, an electrically actuated release device is interposed between the compressor 38 of the cooling system 36 and the shaft of the electric machine 8 or 9 which is controlled to connect and disconnect compressor 38 from/to the shaft of the electric machine 8 or 9 in a selective manner so as not to feed compressor 38 when the electric components do not need to be cooled.

An air radiator (known and not shown) is thermally coupled to condenser 39 which is struck by a flow of air when vehicle 1 is moving so as to disperse the heat present in condenser 39 into the environment; according to a preferred embodiment, such a radiator is also provided with a fan controlled by a thermostat to achieve a forced cooling of the radiator itself if required.

Furthermore, the cooling system 36 comprises a cooling circuit 42, which contains a coolant fluid (typically water mixed with an antifreeze additive) and comprises, in turn, a heat exchanger 43 thermally coupled to evaporator 41 to release heat to the evaporator 41 itself, an electrically actuated circulation pump 44 (i.e. operated by an electric motor in DC at low voltage, preferably having a nominal voltage of 48 Volt, i.e. belonging to the low-voltage section 26), and a tank 45 of the coolant fluid. The cooling circuit 42 firstly extends through the common container 31 which houses the storage system 16 (i.e. both chemical battery packs 17 and 18) and all the power electronics (i.e. the electronic power converters 14, 15, 21, 22, 23 and 25) therein, and then the cooling circuit 42 extends through both electric machines 8 and 9 (in the embodiment shown in FIG. 4, the two electric machines 8 and 9 are connected in the cooling circuit 42 in parallel, but alternatively the two electric machines 8 and 9 may be connected in the cooling circuit 42 in series). There may be heat exchangers in the common container 31, each of which is thermally coupled to the corresponding electric/electronic component to adsorb heat from the electric/electronic component itself. Instead, corresponding cooling labyrinths in which the coolant fluid flows are obtained in the electric machines 8 and 9 (generally in the stator pack).

Figure 5:
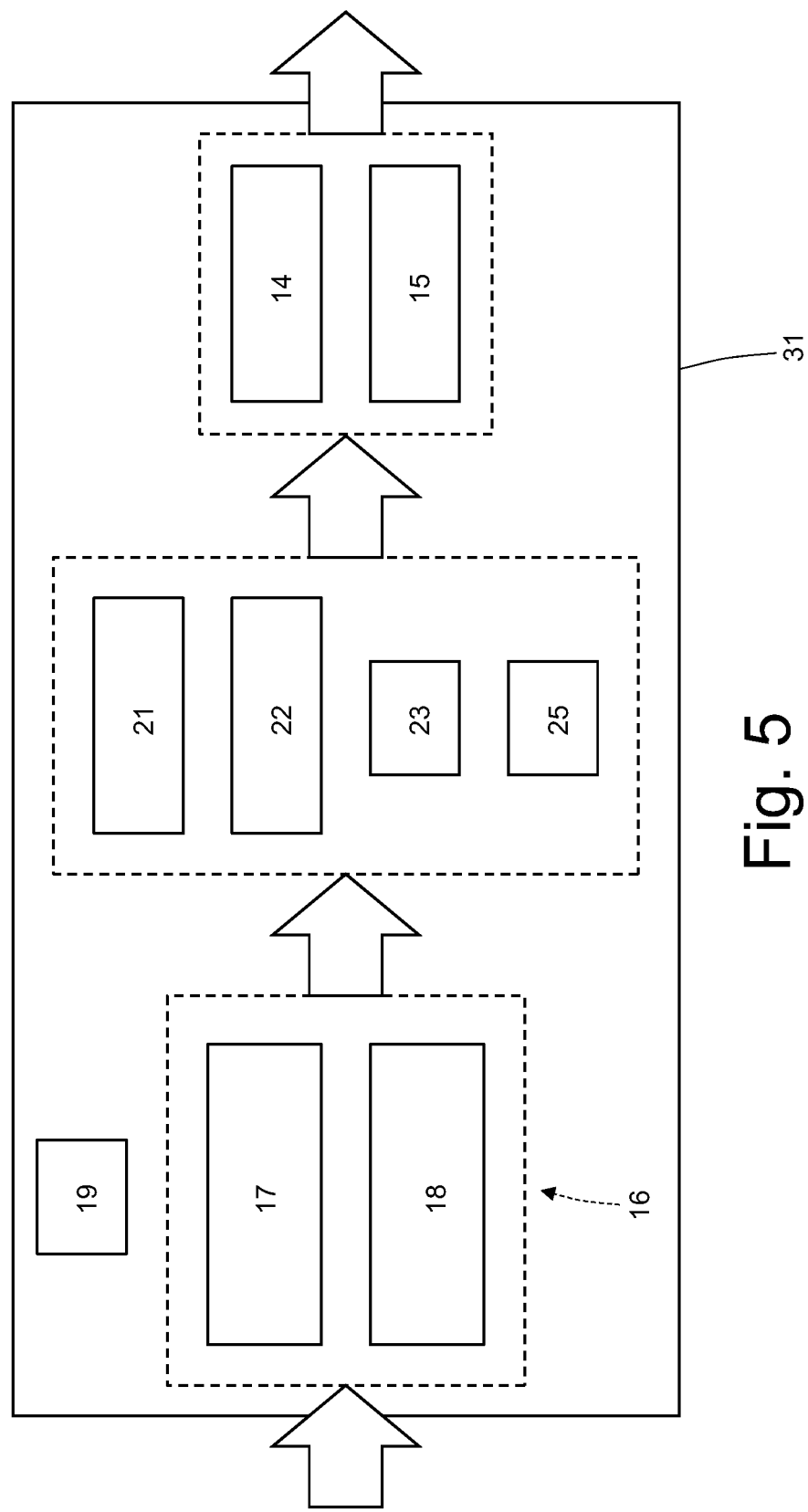
FIG. 5 is a diagrammatic view on enlarged scale of a detail in FIG. 4.
Figure 6:
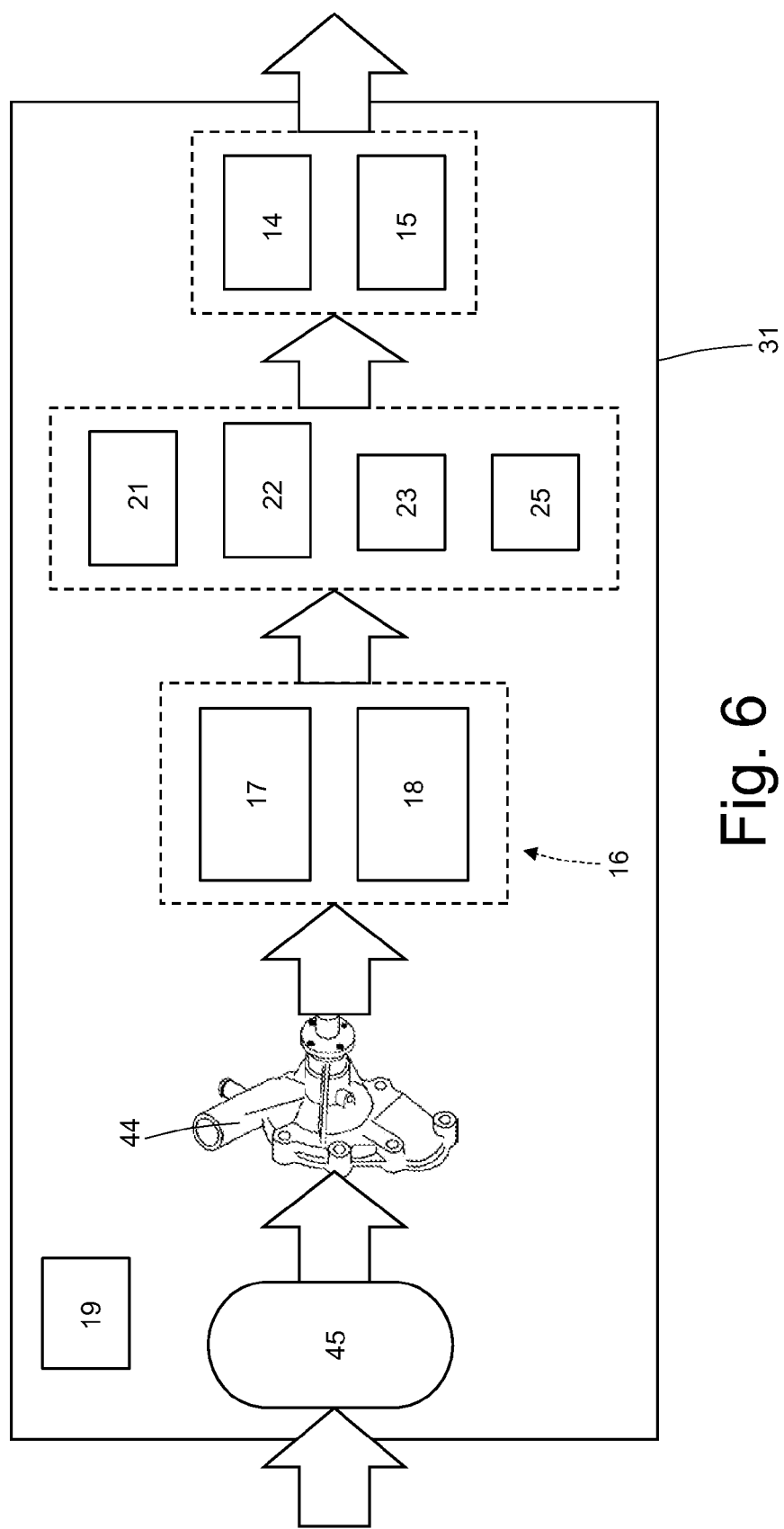
FIG. 6 is a diagrammatic view on enlarged scale of an alternative embodiment of the detail in FIG. 5.

According to a possible embodiment, shown in FIG. 5, the coolant fluid in the common container 31 firstly flows through the chemical battery packs 17 and 18, then flows through the electronic power converters 21, 22, 23 and 25, and finally flows through the electronic power converters 14 and 15. In other words, in the common container 31, the chemical battery packs 17 and 18, the electronic power converters 21, 22, 23 and 25, and the electronic power converters 14 and 15 are arranged in series (in this order) along the cooling circuit 42. According to a preferred (but not binding) embodiment, bypass circuits are provided in the common container 31 with electronically controlled solenoid valves to adjust the cooling of the single parts (i.e. to adjust the amount of cooling of the chemical battery packs 17 and 18, the amount of cooling of the electronic power converters 21, 22, 23 and 25, and the amount of cooling of the electronic power converters 14 and 15). According to the variant shown in FIG. 6, the tank 45 of the coolant fluid and the electrically operated circulation pump 44 are housed in the common container 31.

According to a preferred embodiment, the cooling circuit 42 does not concern the buffer chemical battery 19 of the low-voltage section 24 (even though such a chemical battery 19 is housed in the common container 31 in all cases).

The efficiency of the electric machines 8 and 9 and the electronic power converters 14, 15, 21, 22, 23 and 25 is higher if their temperature is lower (obviously within given limits, particularly for the electronic components) because the lower the temperature of the conductors, the lower the electric resistance of the conductors themselves. Instead, the chemical battery packs 17 and 18 of the storage system 16 optimally work within a given temperature range: if the chemical battery packs 17 and 18 are too cold, their discharge capacity decreases (i.e. less energy is delivered), while if the chemical battery packs 17 and 18 are too hot, the self-discharge (i.e. the energy which is lost during processes inside the chemical batteries) increases; therefore, in order to maximize the efficiency and efficacy of the chemical battery packs 17 and 18, the temperature of the chemical battery packs 17 and 18 must be controlled, thus avoiding the chemical battery packs 17 and 18 from being cooled when the chemical battery packs 17 and 18 are too cold (which event is however rare and bound to particularly cold external temperatures) and cooling the chemical battery packs 17 and 18 when the chemical battery packs 17 and 18 are too hot.

In use, a control unit determines the temperature of each electric/electronic component by means of indirect estimates, e.g. based on electric resistance measurements or by means of a specific temperature sensor. According to the temperatures of the electric/electronic components, the control unit decides whether to generate cold in the refrigeration circuit 37 and thus whether to actuate compressor 38. Furthermore, according to the temperatures of each electric/electronic component, the control unit decides the amount of cooling of the electric/electronic component.

According to a preferred (but not binding) embodiment shown in FIG. 4, the refrigeration circuit 37 is also used by the climate control system of the passenger compartment of vehicle 1; in other words, the refrigeration circuit 37 is shared by the cooling system 36 of the electric power system 20 and the climate control system of the passenger compartment of vehicle 1. Therefore, the refrigeration circuit 37 comprises a further expansion valve 46 (or lamination valve) connected in parallel to the expansion valve 40 and a further evaporator 47 thermally coupled to the climate control system of the passenger compartment of vehicle 1.

According to a different embodiment (not shown, but perfectly equivalent), a greater number of chemical battery packs are provided, each of which is electrically connected to its own DC/DC electronic power converter which has a low-voltage side connected only to its own chemical battery pack and a high-voltage side which is connected in parallel to the high-pressure sides of the other electronic DC/DC power converters.

According to a different embodiment (not shown but perfectly equivalent), a lower number (one) or a higher number (e.g. three or four) of electric machines, each of which is controlled by a corresponding electronic power converter which is connected at the input and in parallel to the electronic power converters 14 and 15. Such electric machines may be mechanically connected to transmission 7, may be mechanically connected to the drive shaft 6 of the internal combustion engine 5, may be mechanically connected to a turbocharger of the internal combustion engine 5, or may be also connected to auxiliary services of vehicle 1 (cooling, lubrication etc.).

The above-described electric power system 20 has many advantages.

Firstly, the two chemical battery packs 17 and 18 are managed in a completely independent manner because the low-voltage sides of the two electronic power converters 21 and 22 are entirely isolated (separate). Therefore, the voltages at the terminals of the two chemical battery packs 17 and 18 may be different in terms of nominal value and variation in use, because it is the task of the electronic power converters 21 and 22 to "equalize" the voltage on high-voltage side (i.e. towards the electronic power converters 14 and 15). This aspect is very important because, as mentioned above, the chemical battery packs 17 and 18 have very different features and thus require different managements in order to operate in an optimal manner.

Furthermore, the chemical battery packs 17 and 18 do not exchange electric energy directly with the electronic power converters 14 and 15 which control the electric machines 8 and 9, but on the contrary the chemical battery packs 17 and 18 exchange electric energy with the electronic power converters 21 and 22, which, by filtering the high-frequency current/voltage oscillations generated by the electronic power converters 14 and 15, allow the chemical battery packs 17 and 18 to be operated in the best manner possible. In other words, the electronic power converters 21 and 22 filter the high-frequency current/voltage oscillations generated by the electronic power converters 14 and 15 and thus prevent such high-frequency current voltage oscillations from discharging on the chemical battery packs 17 and 18 which cause an early wear of the chemical battery packs 17 and 18 themselves.

Another positive function of the electronic power converters 21 and 22 is to maintain constant the voltage on high-voltage side, i.e. towards the electronic power converters 14 and 15 which control the electric machines 8 and 9 independently from the actual voltage at the terminals of the chemical battery packs 17 and 18. In other words, the actual voltages at the terminals of the chemical battery packs 17 and 18 may be mutually different and especially change greatly as a function of the charge state (also of 20-30% from full charge to discharged); the electronic power converters 21 and 22 can self-adjust to have always the same voltage value on the high-voltage side, i.e. towards the electronic power converters 14 and 15 (also in the case of failure of a chemical battery pack 17 or 18 with consequent disconnection of the faulty chemical battery pack 17 or 18). With this regard, it is worth noting that the electronic power converters 14 and 15 cannot modify the voltage value and therefore would not be able to compensate for the voltage differences determined by the chemical battery packs 17 and 18.

The two electric machines 8 and 9 may exchange their electric energy (through the electronic power converters 14 and 15) without passing through the chemical battery packs 17 or 18 of the storage system 16; thereby, the exchange of electric energy between the two electric machines 8 and 9 do not cause any type of wear in the storage system 16 or any energy dissipation in the storage system 16.

By virtue of the presence of the electronic power converters 21 and 22, the nominal voltage of the electrical machines 8 and 9 may be much higher than the nominal voltage of the chemical battery packs 17 and 18 of the storage system 16; thereby, the nominal voltage of the electric machines 8 and 9 can be optimized independently from the nominal voltage of the chemical battery packs 17 and 18 (the nominal voltage of the chemical battery packs 17 and 18 cannot be too high because of the technological and constructional limits of the electrochemical cells). It is worth noting that, by increasing the nominal voltage of the electric machines 8 and 9, the section of the electric conductors of the electric machines 8 and 9 may be reduced, as well as, ultimately, the overall dimension and weight of the electric machines 8 and 9 and of the wires which connect the electronic power converters 14 and 15 to the electric machines 8 and 9.

Finally, since the chemical battery packs 17 and 18 and the electronic power converters 14, 15, 21, 22, 23 and 25 are housed in the same common container 31, the overall dimensions of the electric system may be reduced, the length and dimension of the electric wiring may be minimized, and the operation of cooling may be considerably simplified, thus making it more efficient and effective.

What is claimed is:

1. An electric power system of a vehicle with electric propulsion; the electric power system comprises:
at least a first electric machine;
a storage system comprising at least two chemical battery packs electrically separated from each other;
a first electronic DC/AC power converter, which exchanges electric energy with the storage system and controls the first electric machine;
a first electronic DC/DC power converter, which increases the voltage and has a low-voltage side, which is electrically connected only and exclusively to a first chemical battery pack, and a high-voltage side, which is connected to the first electronic DC/AC power converter; and
a second electronic DC/DC power converter, which increases the voltage and has a low-voltage side, which is electrically connected only and exclusively to a second chemical battery pack, and a high-voltage side, which is connected to the first electronic DC/AC power converter in parallel to the high-voltage side of the first electronic DC/DC power converter;
wherein the electric power system comprises:
a common container, which houses the storage system therein, comprising the two chemical battery packs, the first electronic DC/AC power converter, the first electronic DC/DC power converter, and the second electronic DC/DC power converter; and
a cooling system, which uses a compression refrigeration cycle to cool the storage system, the electronic power converters, and the first electric machine; and
wherein the cooling system comprises:
a refrigeration circuit, which implements a compression refrigeration cycle, contains a refrigerant fluid, and comprises, in turn, a compressor, a condenser, a first expansion valve, and a first evaporator; and
a cooling circuit, which extends through the common container and then through the first electric machine, contains a coolant fluid and comprises, in turn, a heat exchanger, which is thermally coupled to the evaporator so as to release heat to the evaporator itself, an electrically operated circulation pump, and a tank for the coolant fluid.

2. An electric power system according to claim 1, wherein, inside the common container, the coolant fluid firstly flows through the battery packs, then flows through the electronic DC/DC power converters, and finally flows through the first electronic DC/AC power converter.

3. An electric power system according to claim 1, wherein the compressor is electrically operated by means of an electric motor, which is directly supplied with power by the first chemical battery pack.

4. An electric power system according to claim 1, wherein the common container also houses the circulation pump of the cooling circuit.

5. An electric power system according to claim 4, wherein the common container also houses the tank for the coolant fluid of the cooling circuit.

6. An electric power system according to claim 1, wherein the refrigeration circuit is also used by a climate control system of a passenger compartment of the vehicle and comprises a second expansion valve connected in parallel to the first expansion valve and a second evaporator thermally coupled to the climate control system of the passenger compartment of the vehicle.

7. An electric power system according to claim 1 further comprising:
- a second electric machine; and
- a second electronic DC/AC power converter, which exchanges electric energy with the storage system, controls the second electric machine, is connected to the parallel between the high-voltage sides of the electronic DC/DC power converters, and is housed inside the common container.

8. An electric power system according to claim 1 further comprising:
- a third electronic DC/DC power converter, which reduces the voltage, is adapted to supply power to a first low-voltage section, to which auxiliary services of the road vehicle are connected, is electrically connected to the first chemical battery pack, and is housed inside the common container; and
- a fourth electronic DC/DC power converter, which reduces the voltage, is adapted to supply power to a second low-voltage section, to which auxiliary services of the road vehicle are connected, is electrically connected to the first chemical battery pack, and is housed inside the common container.

9. An electric power system according to claim 8, wherein:
- the first low-voltage section has a nominal voltage which is lower than the nominal voltage of the second low-voltage section;
- the first low-voltage section comprises a buffer chemical battery, which is arranged downstream of the third electronic DC/DC power converter; and
- the second low-voltage section has no electric energy storage systems provided with chemical batteries.

10. An electric power system according to claim 1, wherein the first chemical battery pack has a greater specific storable electric energy and a smaller specific deliverable electric power compared to the second chemical battery pack.

11. An electric power system according to claim 1 and comprising a DC recharging socket, which is connected only to the first chemical battery pack by means of the interposition of an electronically controlled switch.

12. An electric power system according to claim 1 further comprising an AC recharging socket, which is connected to the first electronic DC/AC power converter.

13. An electric power system of a vehicle with electric propulsion; the electric power system comprises:
- at least a first electric machine;
- a storage system comprising at least two chemical battery packs electrically separated from each other;
- a first electronic DC/AC power converter, which exchanges electric energy with the storage system and controls the first electric machine;
- a first electronic DC/DC power converter, which increases the voltage and has a low-voltage side, which is electrically connected only and exclusively to a first chemical battery pack, and a high-voltage side, which is connected to the first electronic DC/AC power converter; and
- a second electronic DC/DC power converter, which increases the voltage and has a low-voltage side, which is electrically connected only and exclusively to a second chemical battery pack, and a high-voltage side, which is connected to the first electronic DC/AC power converter in parallel to the high-voltage side of the first electronic DC/DC power converter;
- wherein the electric power system comprises a DC recharging socket, which is connected only to the first chemical battery pack by means of the interposition of an electronically controlled switch.

14. An electric power system according to claim 13, wherein the switch is normally open and is closed only when the DC recharging socket is connected to a recharging circuit.

15. An electric power system according to claim 13, wherein by using the DC recharging socket the first chemical battery pack is recharged directly and the second chemical battery pack may be charged indirectly by using both DC-DC electronic power converters.

16. An electric power system according to claim 13, wherein the first chemical battery pack has a greater specific storable electric energy and a smaller specific deliverable electric power compared to the second chemical battery pack.

* * * * *